United States Patent
Callway

(10) Patent No.: US 10,063,834 B2
(45) Date of Patent: Aug. 28, 2018

(54) METHOD AND APPARATUS FOR PROVIDING VIDEO ENHANCEMENTS FOR DISPLAY IMAGES

(75) Inventor: Edward G. Callway, Toronto (CA)

(73) Assignee: ATI Technologies ULC, Markham, Ontario (CA)

( * ) Notice: Subject to any disclaimer, the term of this patent is extended or adjusted under 35 U.S.C. 154(b) by 914 days.

(21) Appl. No.: 13/231,100

(22) Filed: Sep. 13, 2011

(65) Prior Publication Data

US 2013/0063574 A1 Mar. 14, 2013

(51) Int. Cl.
*H04N 13/25* (2018.01)
*H04N 13/00* (2018.01)

(52) U.S. Cl.
CPC .............................. *H04N 13/0025* (2013.01)

(58) Field of Classification Search
CPC ............. H04N 13/0029; H04N 13/004; H04N 13/0025
See application file for complete search history.

(56) References Cited

U.S. PATENT DOCUMENTS

| | | | |
|---|---|---|---|
| 6,111,596 A * | 8/2000 | Haskell .............. | H04N 13/0025 348/42 |
| 6,115,022 A | 9/2000 | Mayer, III et al. | |
| 2005/0128530 A1* | 6/2005 | Aiba .......................... | G06F 3/14 358/471 |
| 2005/0162566 A1* | 7/2005 | Chuang .................. | H04N 7/012 348/714 |
| 2005/0168630 A1 | 8/2005 | Yamada et al. | |
| 2006/0161948 A1* | 7/2006 | Hwa ....................... | G06F 3/1446 725/37 |
| 2007/0171277 A1* | 7/2007 | Shioi ................... | H04N 13/0048 348/54 |
| 2008/0036691 A1* | 2/2008 | Yamada ................ | G06F 3/1446 345/1.1 |
| 2008/0089428 A1* | 4/2008 | Nakamura ........... | H04N 19/597 375/240.26 |
| 2008/0285087 A1* | 11/2008 | Perkins .................. | G06F 3/1446 358/400 |
| 2009/0009592 A1* | 1/2009 | Takata ............... | G02B 27/2214 348/47 |

(Continued)

OTHER PUBLICATIONS

Imaging Science Foundation; "Introduction:", "ISF and LG:", "How Calibration Works:"; 2004.

(Continued)

*Primary Examiner* — Nazmul Haque
(74) *Attorney, Agent, or Firm* — Faegre Baker Daniels LLP

(57) ABSTRACT

A method and apparatus for processing video utilize individually collected image enhancement statistic information from differing processor cores for a same frame or multi-view that are then either shared between the processor cores or used by a third processor core to combine the statistical information that has been individually collected to generate global image-enhancement control information. The global image enhancement control information is based on a global analysis of both left and right eye views for example using the independently generated statistic information for a pair of frames. Respective image output information is produced by each of the plurality of processor cores based on the global image enhancement control information, for display on one or more displays.

28 Claims, 4 Drawing Sheets

(56) References Cited

U.S. PATENT DOCUMENTS

| | | | |
|---|---|---|---|
| 2009/0022393 A1* | 1/2009 | Bar-Zohar | G06T 7/593 382/154 |
| 2009/0060043 A1* | 3/2009 | Nuyttens | H04N 19/63 375/240.16 |
| 2010/0074594 A1* | 3/2010 | Nakamura | H04N 13/007 386/241 |
| 2011/0095965 A1 | 4/2011 | Yoneoka et al. | |
| 2011/0216827 A1* | 9/2011 | Luo | H04N 19/50 375/240.12 |

OTHER PUBLICATIONS

International Search Report from Canadian Patent Office; International Application No. PCT/CA2012/000822; dated Dec. 28, 2012.

* cited by examiner

METHOD AND APPARATUS FOR PROVIDING VIDEO ENHANCEMENTS FOR DISPLAY IMAGES

BACKGROUND OF THE DISCLOSURE

The disclosure relates generally to methods and apparatus for enhancing images that are displayed on one or more displays, and more particularly to methods and apparatus that provide images that are displayed across multiple displays, video walls, and multi-view systems such as 3D, stereoscopic display systems, video walls, and other multi-view systems.

3D video that employs, for example, multi-view display operations such as stereo video that employs left and right eye views, or other multi-views taken from different perspectives of an object when displayed can provide an impressive 3D effect. 3D video systems are becoming an important part of home and public entertainment. Stereo display devices such as projectors, televisions, flat panels or computer systems may receive, for example, left and right eye stereo images and process them for display. A simple system may scale or color convert the images with no adaptive enhancements. In this case, processing of the left and right eye view frames (also includes fields) independently may not cause any significant image degradation. However, better quality display systems, such as televisions or computer displays with graphics processing units and/or host processors such as CPUs, may employ hardware based or software based video enhancements. ("Processors" also referred to herein as "processor cores" or "cores".) These systems may do significant amounts of adaptive processing such as color enhancements, contrast enhancements, noise removal, edge enhancements, deinterlacing, edge adaptive scaling and other image enhancement operations in an attempt to improve actual or perceived image quality. Adaptive enhancements are not fixed—they change dynamically depending on the pixel values in a small area or over an entire image that is displayed. In a stereo image system, the left and right images may have large areas that are quite different, especially if there is a large stereo displaced foreground object. In this case, the temporal information used for enhancements may appear to be quite different for the left eye and right eye image. As used in this example, the temporal information refers to information taken from a single right eye or left eye image. Also the left and right eye images may be processed by different hardware components, whether GPU or CPU cores or even in different image devices altogether such as dual projectors.

If the enhancements of an object or area in the image are independent for each eye view, then the left and right eye frames may result in unintended image differences which can drastically reduce the quality of a 3D image. This may cause, for example, eye strain or headaches and can significantly reduce consumer appeal.

Also, where multiple displays are used to display a single logical frame (i.e., where each of the displays is controlled to display a portion of a logical frame) each display may output a portion of a larger logical frame and the corresponding graphics processor or processor cores that control one or more frames may not communicate enhancement information across multiple processors. Accordingly, poor image quality can result when a single display frame is displayed across multiple displays. For example, different portions of a logical frame may be processed by differing GPUs or CPUs. Each processor core may perform its own image processing for its respective portion of the logical frame that is displayed. For example, with a wall of multiple displays that display a single logical frame, each respective display may display output from one or more GPUs (for example, GPU cores). However, separate dynamic enhancement may be performed using different paths such that, for example, differing GPUs that provide image enhancement processes are not properly communicated (or not communicated at all) to the other GPUs that produce other color enhancements for other portions of the entire logical image.

It is also known to employ multiple graphics processor cores to output a single frame on a single display. For example, each processor core may process a portion of a checkerboard pattern, differing lines or other portions of an image single display. However, such implementations use another processor core (e.g., host) to determine image enhancement statistic information for a full frame. As such, the host processor core has to perform all of the statistics processing and the host processor core may not be at the appropriate portion in the overall image processing pipeline. Also, analyzing pixel data by the host can result in large amounts of bandwidth and processing inefficiencies.

Also, existing single image displays or stereo or multi-video wall installations are known to perform a video calibration using methods such as static video calibration techniques that set identical color temperature and brightness and gamma and contrast settings using, for example, external cameras or other techniques. These video calibration techniques however are typically static one time measurements and calibrations. They do not address issues of multiple images and displays that are slightly different but must still receive identical, coordinated image enhancements.

Accordingly, an improved video processing apparatus, system and methods are desirable.

BRIEF DESCRIPTION OF THE DRAWINGS

The invention will be more readily understood in view of the following description when accompanied by the below figures and wherein like reference numerals represent like elements, wherein.

DETAILED DESCRIPTION OF THE PREFERRED EMBODIMENTS

Briefly, a method and apparatus for processing video utilizes individually collected image enhancement statistic information from differing processor cores for a same frame or multi-view (i.e., multiple "views" or perspectives" of the same scene) that are then either shared between the processor cores or used by a third processor core to combine the statistical information that has been individually collected to generate global image-enhancement control information. The global image enhancement control information may be based on an analysis of both left eye and right eye view of a 3D frame using the independently generated statistic information for a pair of frames or frame. In one example, the method and apparatus utilizes a plurality of processor cores that analyze respective portions of a single large surface or a group of multi-view frames and produces respective image enhancement statistic information based on the analysis. The global image enhancement control information is generated based on the respective image enhancement statistic information, for application to the display image or the multi-view frames of interest to effect an image enhancement parameter such as dynamic contrast or other image enhancement parameter. Respective image output information is produced by each of the plurality of processor cores based on the global image enhancement control information, for display on one or more displays.

Where a third processor core is not employed, the two processor cores that obtained their independent respective image enhancement statistic information may share their obtained information so that one or each of the plurality of processor cores can generate image enhancement control information that is based on an analysis entire image. The individually gathered statistics are hence effectively linked to generate a common or other adaptive corrections to, for example, 3D eye view pairs or logical frame displayed over multiple displays, using global image enhancement control information. As such, global image enhancement control information may be applied for both a left and right eye frame pair, to portions of an image that is displayed on a plurality of displays or to one image (e.g., a single large surface) that is displayed using a plurality of displays.

In one example, an average pixel level for different portions of an image are determined by each processor. Global image enhancement control information includes generating a control value common for each of a plurality of displays that display the differing portions of the image. In another embodiment the global image enhancement control information may be different values for different processor cores to effect a global enhancement effect (for the image or pair of eye view images).

Figure 1:
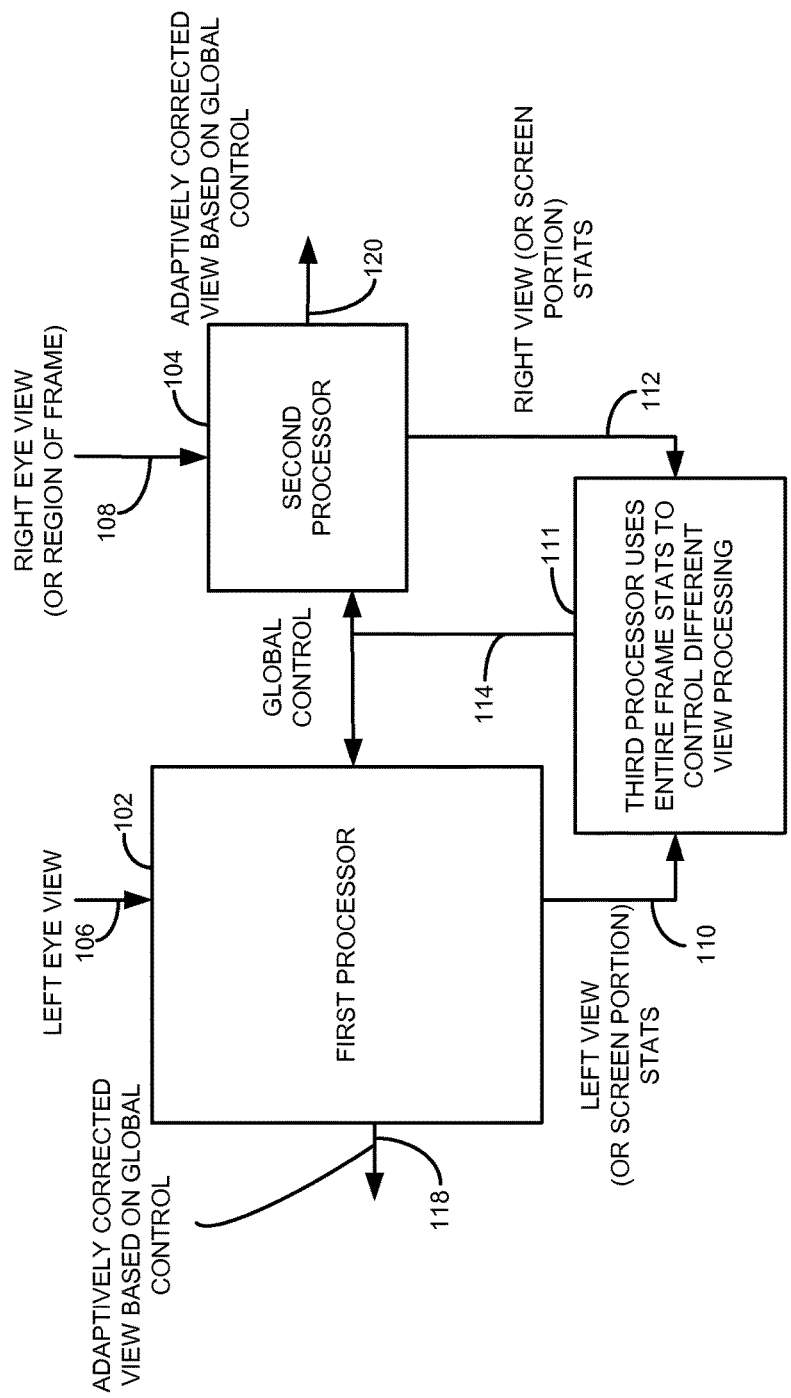
FIG. 1 is a block diagram of an apparatus that employs a plurality of processor cores and another processor core to generate global image enhancement control information for the plurality of processor cores in accordance with one example as set forth in the disclosure.

FIG. 1 illustrates one example of an apparatus 100, such as, but not limited to, a television, flat panel display, projector, computer system or any other suitable display system. In this example, a plurality of processor cores 102 and 104 analyze respective portions of a display image such as in the case where a single large surface is displayed across multiple displays so that a logical frame is displayed across multiple displays. Each display displays a portion of the logical frame. In another example, each of the processor cores may analyze a left and right eye frame pair or a group of multi-view frames to produce respective image enhancement statistic information based on the analysis. For purposes of illustration, the example will be described with respect to a 3D display system wherein left eye views and right eye views of a left and right eye pair are processed for a 3D display system. However, it will be recognized that the operations described herein may be equally applicable to multi-display systems such as video walls, multiple projector systems and other suitable systems wherein differing processor cores may process differing portions of a logical display frame. The processor cores 102 and 104 may be any suitable processors. By way of example, they may be graphics processing units that employs one or more graphics processing cores or may be central processing units that employ one or more cores. They analyze digital signal processor cores or any other suitable processor cores that employ image processing operations such as image enhancement operations. Such processor cores may employ adaptive color and contrast enhancement, noise removal, edge enhancements, deinterlacing, edge adaptive scaling or any other suitable image enhancement operations.

In this example, the first processor core 102 analyzes a left eye view frame (left field) and the second processor core 104 analyzes the corresponding right eye view frame of a left and right eye pair shown as 106 and 108 respectively to produce image enhancement statistic information. Statistic information may include a histogram of luminance levels in view of contrast levels, brightness correction information, color correction statistics or cadence statistics for 3:2 pulldown operations. The frame information may come from any suitable memory or other processor core path in an image processing system as known in the art.

A third processor core 110 is also shown in this example which is in communication with the first and second processor cores 102 and 104 to receive respective image enhancement statistic information 110 and 112 from each of the respective processor cores 102 and 104. Examples of the respective image enhancement statistic information for each of the left and right eye views may include, for example, average picture level (average luminance over a certain percentage of the image as known in the art, or histogram of luminance or color), frequency content of a view, a noise measurement to determine the amount of noise in an eye view, or the detection of whether closed caption text or other graphics exists in an eye view (e.g., if captioning is darker in one eye image this is taken into account as a factor for both eye views).

In this example, the third processor core may be, for example, a CPU or any other suitable programmable processor. It will be recognized that the operations described herein may be combined with other processes and that the various processor cores may carry out other operations of the system as required. Processor cores may be physically or virtually separate. The third processor core 110 generates global image enhancement control information 114 that is applied for the multi-view frames of interest such as the left and right eye frames 106 and 108 to enhance their image. The global image enhancement control information 114 is determined based on the respective image enhancement statistic information from each of the plurality of processor cores 110 and 112. In this example, the respective image enhancement statistic information 110 is based on the entire left eye frame and the statistic information 112 is right eye frame respectively. In this way, the global control information 114 takes into account the entire group of multi-view images of interest such as a left eye and right eye image pair. Using the global image enhancement control information 114, each of the first and second processor cores 102 and 104 produce respective enhanced image output information 118 and 120 to be output on the display(s) (not shown in this figure). The image output information 118 and 120 is adaptively corrected or enhanced based on the global control information 114. In one example, the same global control information is used by both first and second processor cores and the global control information takes into account the statistic information on both left eye and right eye frames or all portions of a frame that are produced by differing processor cores so that improved video enhancement control occurs.

In this example, the respective plurality of processor cores 102 and 104 apply the global image enhancement control information 114 to respective left and right eye frames.

However, in another embodiment where respective portions of a single display image is displayed on multiple displays, the plurality of processor cores produce respective image enhancement statistic information by analyzing each of the respective portions of the single display image. The plurality of processor cores then provide the corrected (enhanced) image output information 118 and 112 to a plurality of displays.

Figure 2:
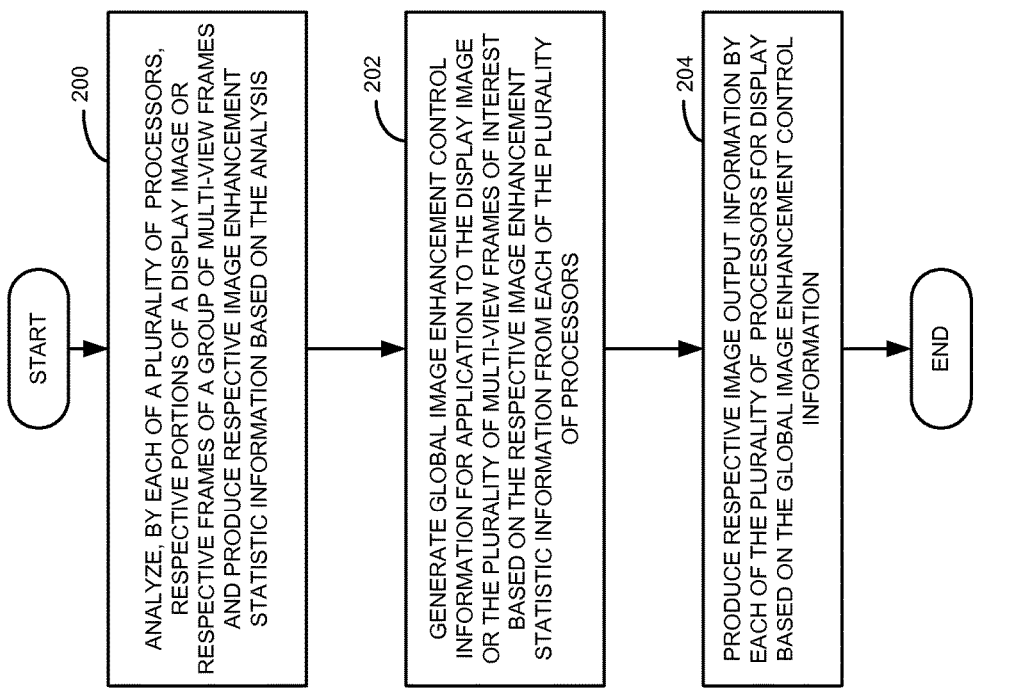
FIG. 2 is a method for processing video in accordance with one example as set forth in the disclosure.

Referring also to FIG. 2, a method for processing video is shown that may be carried out, for example, by the apparatus of FIG. 1, or any other suitable structure. As shown in block 200, the method includes analyzing, by each of a plurality of processors, respective portions of a display image or respective frames of a group of multi-view frames and producing respective image enhancement statistic information 110 and 112 based on the analysis.

As shown in block 202, the method includes generating global image enhancement control information 114 for application to the display image such as a logical display image that is displayed using multiple physical displays or for example, the plurality of multi-view frames of interest in the application where, for example, left eye and right eye view frames are used. This may be done, for example, by a central processor, such as a third processor, or by either the first or second processor cores sharing their respective image enhancement statistic information with each other so that both have the same image enhancement statistical information for an entire logical frame, left and right eye pair, or other suitable grouping of frame information. The image-enhancement statistic information is produced by each processor core for corresponding frame regions of left and right eye views. The global image enhancement control information is generated based on the respective image enhancement statistic information from each of the plurality of processors. For example a noise level may be generated for each eye view. If a one eye view includes a ball and another eye view has sand for a beach ball on a sandy beach scene, the estimated noise level of the eye view with the ball (e.g., −50 dB) will have a lower noise level but the estimated noise level of sand may be quite high (−30 dB). Both noise estimates from both eye view frames are considered. The global image enhancement control information may indicate that the noise estimate for the entire image (combination of both eye view frames) is −50 dB (taking the lower of the two). The image processor core that provided the −30 dB value would use the −50 dB estimate to separate what is noise versus image content.

As shown in block 204, the method includes producing respective image output information 118 and 120, such as a left eye view and a right eye view in the case of a left and right eye pair for 3D viewing system, or differing portions of a logical frame that are output to differing displays. The respective image output information 118 and 120 is produced for display based on a global image enhancement control information that was either shared and passed from each processor core to the other, or accumulated by a third processor core or other central authority.

Stated another way, the method includes obtaining separate image enhancement statistic information for each of a plurality of different portions of a single large surface or for each of different multi-views of an object for a 3D video system that are to be displayed on one or more displays by a plurality of different image processors. The method may also include generating the global image enhancement control information for application by both different image processor cores using separate image enhancement statistic information provided by each of the different image processors. The method may include producing respective image output information by each of the different image processor cores for display based on the global image enhancement control information.

In one example, the processor cores share their respective image enhancement statistic information with each other and the global image enhancement control information is generated by each of the processor cores separately where each processor core has a copy of the same global image enhancement control determinator logic. This means each processor core generates its own raw statistics, shares those statistics with the other processor cores—and then each processor core (re)generates the same global enhancement control for its own use. This is another operation mode, as opposed to passing the individual statistics to one processor core that generates the control and sends it back to the individual processors.

In this example, statistic sharing is used such that each of the plurality of processor cores generates image enhancement control information (global) based on the image enhancement statistics obtained from the other of the plurality of processors. In one example, producing respective image enhancement statistic information by each of the plurality of processor cores includes compiling data that represents, for example, noise level information for pixels in a portion of a respective portion of an image, compiling average picture level information, obtaining peak black and white levels, compiling frequency ranges that are occupied, or cadence detection for 3:2 pulldown operations, or any other suitable image enhancement statistic information. Each processor core would gather information about a noise level estimate for the region of the source images it can access. This information would be shared to the other processor cores looking at other regions. Each processor core would run the same algorithm on the shared data and generate the same global noise estimate, which each processor core could then apply to the region it can process. In this way the same noise level estimate and resulting actions can be applied to the entire image stream, despite regions being in different processors, and without passing a final estimate between the processors.

Where the statistic information is cadence detection information, such as when video is shot at 24 frames per second but delivered with 60 frames per second and the system wants to use 24 frames per second, the system looks at motion information from both processor cores since motion may be in only one of the eye views. The cadence pattern, once detected using both eye views is applied to both eye views.

As noted above where an additional processor core is employed, the additional processor core may generate the global image enhancement control information for use by the plurality of other processor cores to provide a centralized generation of the global image enhancement control information.

To produce the respective corrected view information also referred to as the respective image output information 118 and 120, the global image enhancement control information 114 is applied to portions of an image that is displayed on a plurality of displays. For example, the same gain adjustment is provided to both the first and second processor core in the context of an average picture level statistic application. The global image enhancement control information is equally applied for both left and right eye frame pairs as well in the context of a 3D rendering system. As a result, there are not unintended image differences between left and right eye views since both views are taken into account prior to the application of the image enhancement operations.

As used herein, the respective image enhancement statistic information may be temporal information obtained from temporally related frames (fields). For example, the left/right pair of a stereo image may have a dark foreground object mostly obscuring a light background object in a left image, but the right image may show mostly the light background. A typical dynamic contrast algorithm applied independently to the left and right images would apply a different contrast and brightness or gamma to these two images which would cause the light background object to appear different on each display or some other unintended effect. A common correction is applied to both frames so that the background object will appear the same across multiple displays. A typical embodiment would be to average the individual average picture level measurements or luminance histograms of the left and right images into one measurement, and then use that to generate a new gamma curve which would be simultaneously applied to both source images.

As another example in the case of multiple physical displays that display a single frame, for example in a video wall, a single source image also referred to as a single large surface is displayed using multiple displays. In prior art methods each subportion of the image that is displayed on a particular display may be enhanced differently. However, with the instant disclosed methods and structure, in one example, all processor cores associated with all displays receive a common correction control value referred to as the global image enhancement control information. It will be recognized that if as part of a prior calibration each display was found to have different characteristics such as light output or color temperature, then the global enhancement information could be further modified to include display specific differences so the effect of these differences could be reduced. Prior art systems may show one monitor with a light background object and another monitor with mostly a large black foreground object and differing image enhancement algorithms or processes would be applied using information only for those particular images shown on a particular screen as opposed to using statistical information from other portions of the entire image even though those portions are displayed on a different display.

It will be recognized that application of the methods and apparatus may be employed in various systems. For example, there may be a mono or stereo image that is split across multiple displays wherein different processor cores or display render engines are used for each of the different monitors. In another example there may be a mono or stereo image that is split across multiple CPU cores for rendering or that are split across multiple GPU cores for rendering. Other examples may include where a mono or stereo image is split across multiple GPU and CPU cores for rendering (such as by OpenCL) or where mono or stereo images are split across multiple software and hardware blocks for rendering or when a mono or stereo image is split across multiple applications or application instances for rendering. Accordingly, image statistic information is collected for individual images or by individual display devices as convenient, but the individually collected statistics are combined and delivered to one enhancement process which uses the statistics to effect a parameter such as a dynamic contrast which is properly applied to the whole image. Or multiple copies of one enhancement process . . . .

If the multiple images or image pieces are rendered for display in software (e.g., on a CPU or GPU acting as part of a group of programmable processor core such a using the OpenCL programming environment) then the statistics may be passed in software methods such as through registers or API calls or memory locations or messages. If the rendering devices are split between, for example, a CPU and a GPU, the statistics may be passed using API calls or buses or any other suitable communication technique. If the rendering devices are split across separate physical devices such as individual devices in a video wall, then the statistics may be passed using local networks such as Bluetooth or power line devices, infrared connections or any other suitable mechanism. If the rendering devices are split across a large distance such as coordinated displays in different countries for movie presentations or other uses, then the statistics may be passed using wide area networks, the Internet, or any other suitable communication technique. When one image is split into pieces and displayed on more than one monitor or display, the same global or temporal adaptive enhancements are applied to all the displays. This avoids regions of the displayed image having different and unintended video processing differences.

Figure 3:
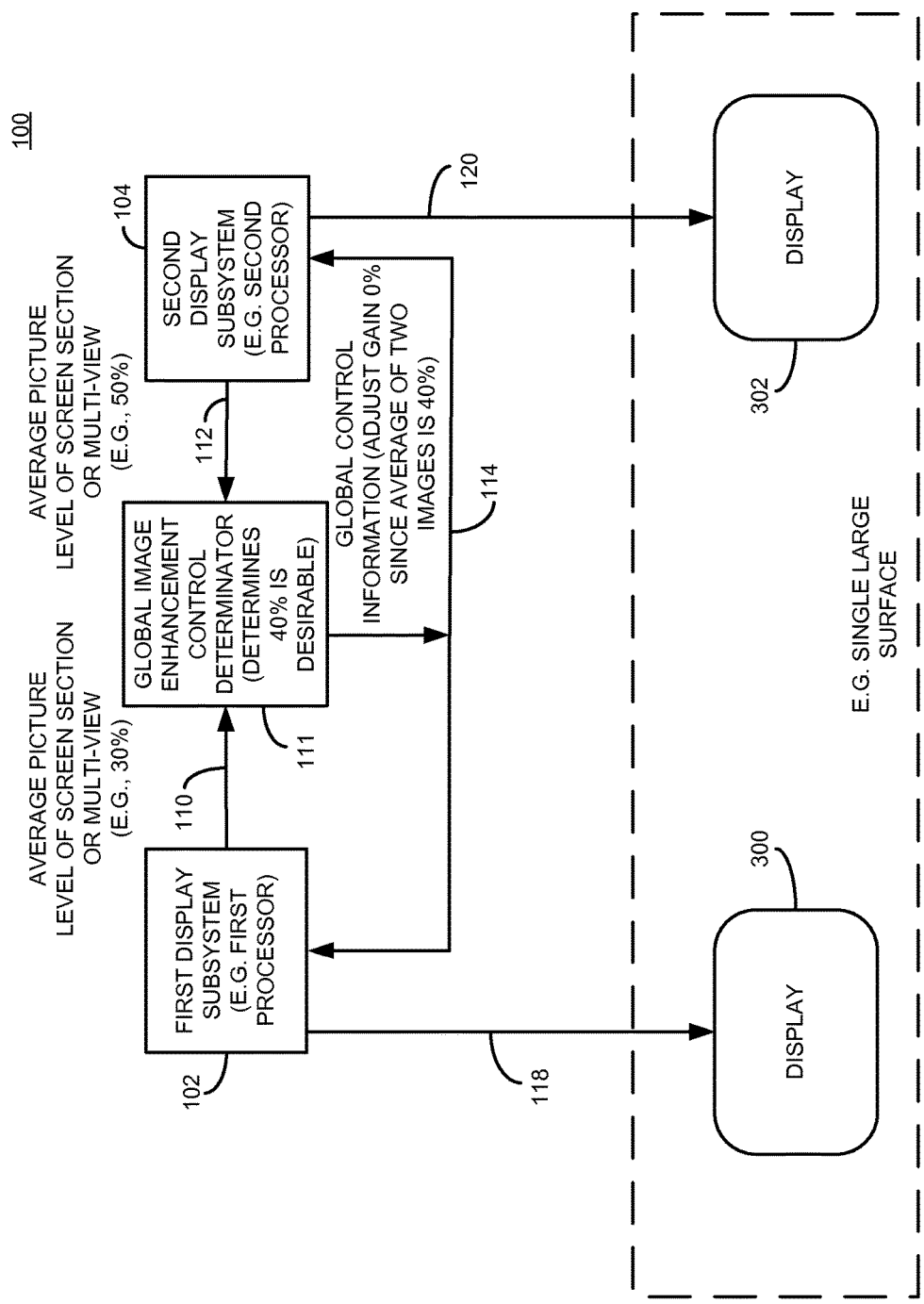
FIG. 3 illustrates one example of an apparatus that employs a plurality of displays and global control information in accordance with one example set forth in the disclosure.

FIG. 3 illustrates another example of an apparatus 100 which in this example is shown to include a plurality of displays 300 and 302 each of which display a portion of a single surface or logical frame. This may also be referred to as a single large surface that is displayed using a plurality of displays, each display displaying a portion of a larger image. In this example, the image enhancement statistic information is an average picture level (APL) calculated by each processor core 102 and 104 which each serve as a display subsystem of the apparatus 100. The respective image enhancement statistic information 110 and 112 in this example is shown for example that the processor core 104 determines that its portion of the larger surface that it generates for display on display 302 has a 50% average picture level whereas the processor core 102 determines that the portion of the image displayed on display 300 has a 30% average picture level. The processor core 111 serves as the global image enhancement control determinator to determine the global control information 114 using both the 50% APL and the 30% APL from the two processor cores for the two screen portions. The processor core 111 determines that the global image enhancement control information 114 which is based on global statistics of the entire image indicates that the gain should not be adjusted as it determines that a 40% APL is desirable for the overall logical frames (based on user input for example).

As such, the processor cores analyze respective portions of an image by determining an average picture level of respective differing portions of an image and the processor core 111 in this example generates the global image enhancement control information 114 which is based on statistics obtained from both processor cores which in this example adds up to the entire image. The functions of the global image enhancement control determinator may be carried out by either the first or second processor core if desired as opposed to a third processor core as noted above. In this embodiment, the plurality of processor cores share respective image enhancement statistic information for example, if the global image enhancement control determinator functionality is carried out by the processor core 104, then the respective statistic information is provided to the processor core 104. In either embodiment, the plurality of processor cores produce the respective image output information 118 and 120 for display in response to or based on the global image enhancement control information 114.

Figure 4:
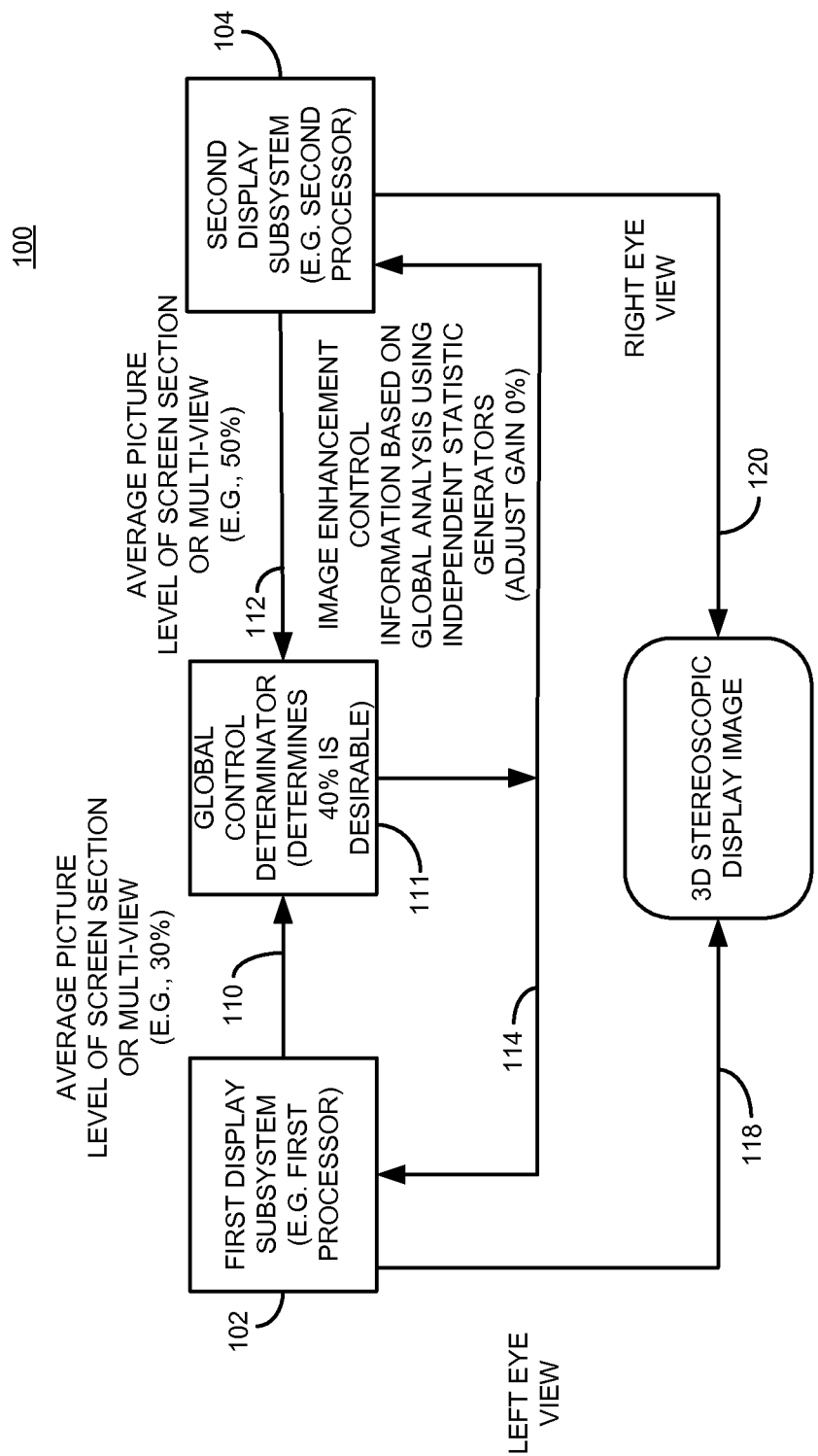
FIG. 4 is an alternative embodiment illustrating one example of an apparatus that employs global control information applied to a multi-view display system in accordance with one example set forth in the disclosure.

FIG. 4 illustrates another example of the apparatus 100 where the information being enhanced are right eye and left eye frame pairs for 3D stereoscopic display. Same operations are applied except the information being analyzed and enhanced are left eye and right eye views. Accordingly, appropriate image enhancement algorithms for left eye and right eye viewing enhancement may be employed. For example, these may include the above mentioned operations such as noise removal or color and edge enhancement, but may also include specific 3D stereo operations such as measuring and modifying the amount of perceived depth in the image.

In another example, a 3D stereoscopic stream consisting of left and right images could be split into a left stream driving a left projector through a display processor, and a right stream driving a right projector through another display processor. Each display processor core would gather information at the pixel or global (field or frame or longer sequence) level and send it to a common processor core (which may be one of the left or right processors). The common processor core would then decide on a suitable enhancement to be applied to the left and right images through the respective processor.

The programmed processor cores as described herein may be programmed by executing instructions stored in a computer readable medium, such as one or more RAMs, ROMs or any other suitable non-transitory storage medium. For example, a computer readable medium may include executable instructions that when executed on a respective processor, causes the system to analyze respective portions of a display image or respective frames of a group of multi-view frames and produce respective image enhancement statistic information based on the analysis. The system may also generate global image enhancement control information for application to the display image or the plurality of multi-view frames of interest based on the respective image enhancement statistic information from each of a plurality of processor cores and produce respective image output information by each of the plurality of processor cores for display based on the global image enhancement control information, as well as perform the other relevant operations described herein.

Among other advantages, image enhancement statistic information obtained by differing processor cores (e.g., cores on a same integrated circuit or separate integrated circuits) is shared or provided to a central authority (or one or more of the processor cores serving as a central authority) that utilizes both or all of the respective separate statistic information to evaluate on a per-logical frame basis or left right/right eye pair basis or other group of multi-view frame basis appropriate image enhancement process to employ. Global control information is then provided to the differing processor cores and the respective processor cores provide the image enhancement changes to the pixel data and output the information for display.

The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. A method for processing video comprising:
analyzing, by each of a plurality of processors, respective portions of a display image or respective frames of a group of multi-view frames and producing respective image enhancement statistic information based on the analysis, the image enhancement statistic information being information describing image enhancements available to be applied to the given display image portion or frame to produce a difference in the appearance of said display image portion or frame; and
generating, by another processor separate from the plurality of processors, global image enhancement control information for application to at least two analyzed portions of the display image or at least two of the plurality of multi-view frames of interest based on the image enhancement statistic information from at least two of the plurality of processors,
wherein generating global image enhancement control information comprises sharing respective image enhancement statistic information among the plurality of processors and wherein each of the plurality of processors generates image enhancement control information based on image enhancement statistics obtained from another of the plurality of processors.

2. The method of claim 1, further comprising producing respective image output information by each of the plurality of processors for display based on the global image enhancement control information.

3. The method of claim 2, further comprising displaying the respective image output information.

4. The method of claim 1, wherein generating global image enhancement control information comprises generating by the another processor, the global image enhancement control information for use by the plurality of processors to produce respective image output information by each of the plurality of processors.

5. The method of claim 1, further comprising applying the global image enhancement control information commonly to portions of an image that is displayed on a plurality of displays.

6. The method of claim 1, further comprising applying the global image enhancement control information for both a left and right eye frame pair.

7. The method of claim 1, wherein the global image enhancement control information is comprised of a common contrast correction level to apply to a plurality of displays used to display a single large surface.

8. The method of claim 1, wherein analyzing respective portions of an image comprises determining by each processor, an average picture level of differing portions of an image and wherein generating the global image enhancement control information comprises generating a control value common for a plurality of displays.

9. The method of claim 1, wherein analyzing respective frames of a group of multi-view frames comprises determining by each processor, an average picture level of a left and right eye frame pair and wherein generating the global image enhancement control information comprises generating a control value common for the left and right eye frame pair.

10. The method of claim 1, wherein producing respective image enhancement statistic information by each of the plurality of processors comprises compiling data representing at least one of: noise level information for pixels in a portion of an image, average picture level information, peak black and white levels, frequency ranges that are occupied and cadence detection.

11. An apparatus comprising:
a plurality of processors operative to analyze respective portions of a display image or respective frames of a group of multi-view frames and produce respective image enhancement statistic information based on the analysis, the image enhancement statistic information being information describing image enhancements available to be applied to the given display image portion or frame to produce a difference in the appearance of said display image portion or frame; and another processor separate from the plurality of processors, in communication with the plurality of processors and operative to generate global image enhancement control information for application to at least two analyzed portions of the display image or at least two of the plurality of multi-view frames of interest based on the image enhancement statistic information from at least two of the plurality of processors, wherein the another processor separate from the plurality of processors is operative to share respective image enhancement statistic information among the plurality of processors and wherein each of the plurality of processors generates image enhancement control information based on image enhancement statistics obtained from another of the plurality of processors.

12. The apparatus of claim 11, wherein the plurality of processors are operative to produce respective image output information for display based on the global image enhancement control information.

13. The apparatus of claim 11, further comprising a plurality of displays, operatively coupled to the plurality of processors, and wherein the plurality of processors apply the global image enhancement control information to respective portions of the image and provide the image output information to the plurality of displays.

14. The apparatus of claim 11, wherein each of a respective plurality of processors apply the global image enhancement control information to a respective left and right eye frames.

15. The apparatus of claim 13, wherein the global image enhancement control information is comprised of a common contrast correction level to apply for the plurality of displays used to display a single large surface.

16. The apparatus of claim 11, wherein analyzing respective portions of an image comprises determining by each of the plurality of processors, an average picture level of a respective differing portion of an image and wherein generating the global image enhancement control information comprises generating a control value common for a plurality of displays.

17. The apparatus of claim 11, wherein analyzing respective frames of a group of multi-view frames comprises determining by each of the plurality of processors, an average picture level of a respective left and right eye frame pair and wherein generating the global image enhancement control information comprises generating a control value common for the left and right eye frame pair.

18. An apparatus comprising:
a plurality of processors operative to analyze respective portions of a display image or respective frames of a group of multi-view frames and produce respective image enhancement statistic information based on the analysis and generate, by another processor separate from the plurality of processors, global image enhancement control information by sharing respective image enhancement statistic information among the plurality of processors, the image enhancement statistic information being information describing image enhancements available to be applied to the given display image portion or frame to produce a difference in the appearance of said display image portion or frame, and wherein each of the plurality of processors generates the global image enhancement control information based on image enhancement statistics obtained from another of the plurality of processors; and wherein the plurality of processors are operative to produce respective image output information for display based on the global image enhancement control information, wherein the another processor separate from the plurality of processors is operative to share the respective image enhancement statistic information anions the plurality of processors and wherein each of the plurality of processors generates image enhancement control information based on image enhancement statistics obtained from another of the plurality of processors.

19. The apparatus of claim 18, wherein each of the respective plurality of processors apply the global image enhancement control information for a respective left and right eye frame.

20. The apparatus of claim 18, further comprising a plurality of displays operatively coupled to the plurality of processors and wherein the global image enhancement control information is comprised of a common contrast correction level to apply for the plurality of displays used to display a single large surface.

21. The apparatus of claim 18, wherein analyzing respective portions of an image comprises determining by each of the plurality of processors, an average picture level of a respective differing portion of an image and wherein generating the global image enhancement control information comprises generating a control value common for a plurality of displays.

22. The apparatus of claim 18, wherein analyzing respective frames of a group of multi-view frames comprises determining by each of the plurality of processors, an average picture level of a respective left and right eye frame pair and wherein generating the global image enhancement control information comprises generating a control value common for the left and right eye frame pair.

23. A non-transitory computer readable medium comprising executable instructions that when executed on one or more processors causes the one or more processors to:
analyze, by each of a plurality of processors, respective portions of a display image or respective frames of a group of multi-view frames and produce respective image enhancement statistic information based on the analysis, the image enhancement statistic information being information describing image enhancements available to be applied to the given display image portion or frame to produce a difference in the appearance of said display image portion or frame;

generate, by another processor separate from the plurality of processors, global image enhancement control information for application to at least two analyzed portions of the display image or at least two of the plurality of multi-view frames of interest based on the image enhancement statistic information from at least two of the plurality of processors;

produce respective image output information by each of the plurality of processors for display based on the global image enhancement control information; and share respective image enhancement statistic information among the plurality of processors and generate, by each of the plurality of processors, image enhancement control information based on image enhancement statistics obtained from another of the plurality of processors.

24. The method of claim 1, wherein image enhancement statistic information includes at least one of adaptive color enhancement, contrast enhancement, noise removal, edge enhancements, deinterlacing, and edge adaptive scaling.

25. The method of claim 1, wherein the processors analyzing the respective portions of the display image or respective frames of a group of multi-view frames are the same processors that are generating the respective portions of the display image or frames of the group of multi-view frames.

26. The apparatus of claim 11, wherein the plurality of processors are further operable to generate the respective portions of the display image or frames of the group of multi-view frames.

27. The apparatus of claim 18, wherein the plurality of processors are further operable to generate the respective portions of the display image or frames of the group of multi-view frames.

28. The non-transitory computer readable medium of claim 23, wherein the instructions further cause the one or more processors to generate the respective portions of the display image or respective frames of the group of multi-view frames.

\* \* \* \* \*